May 1, 1962   J. L. STRATTON   3,032,052
SAFETY BRAKE VALVE
Filed May 28, 1959   2 Sheets-Sheet 1
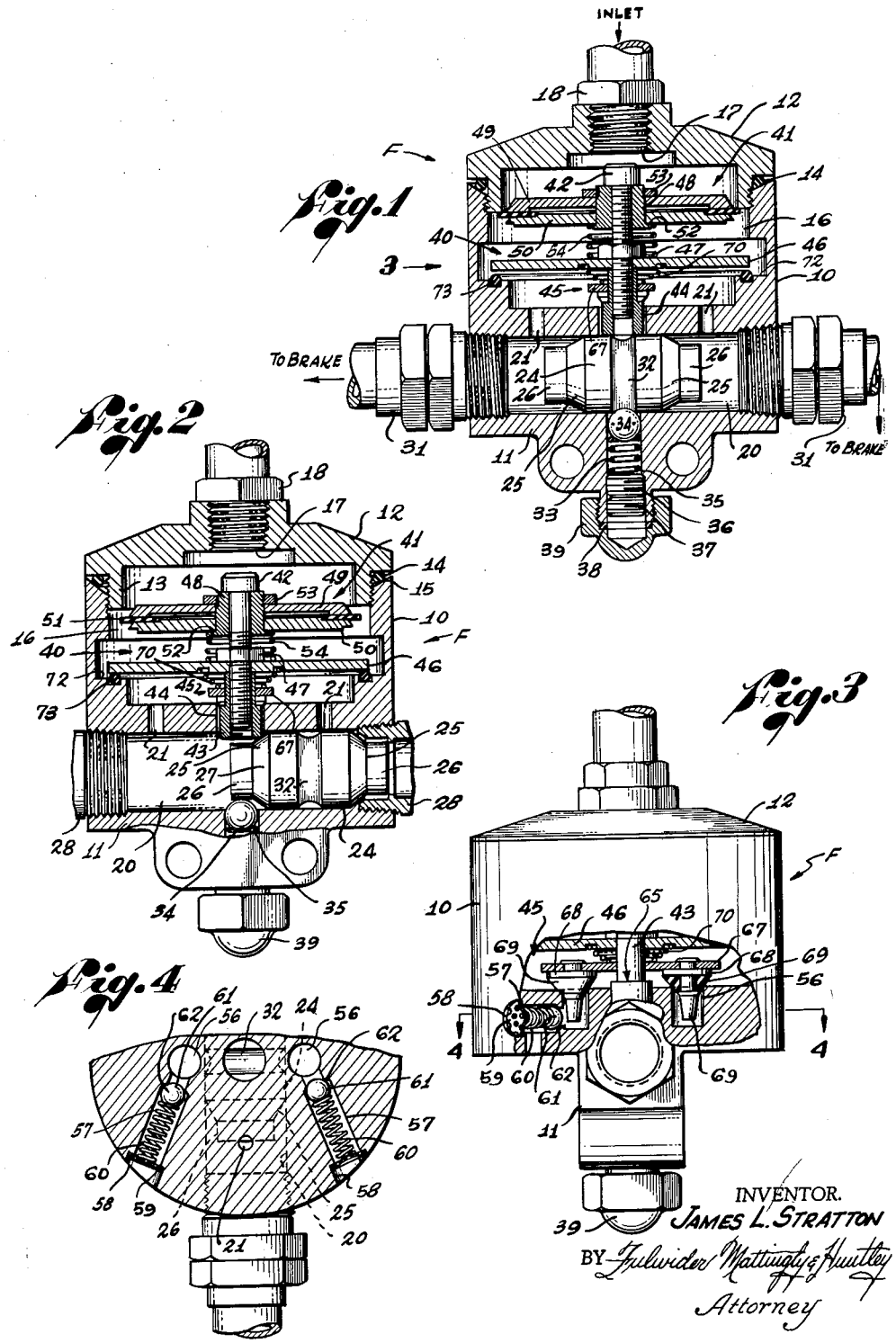
INVENTOR.
JAMES L. STRATTON
BY Fulwider Mattingly & Huntley
Attorney May 1, 1962  J. L. STRATTON  3,032,052
SAFETY BRAKE VALVE
Filed May 28, 1959
2 Sheets-Sheet 2
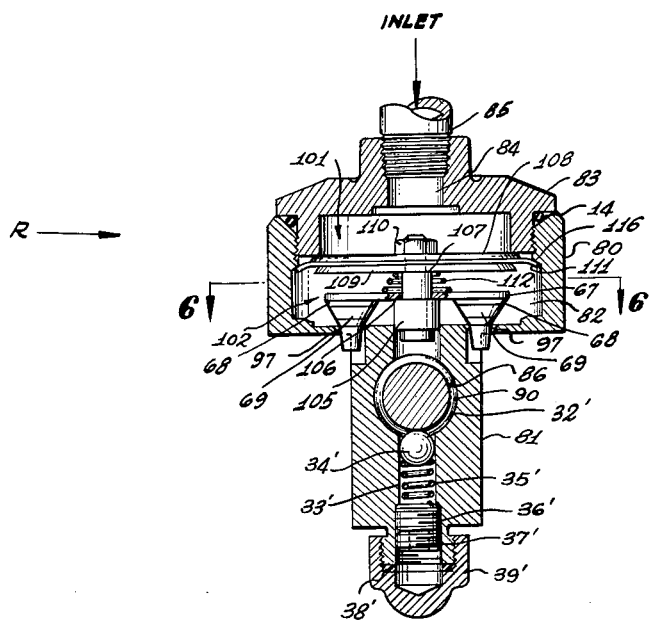
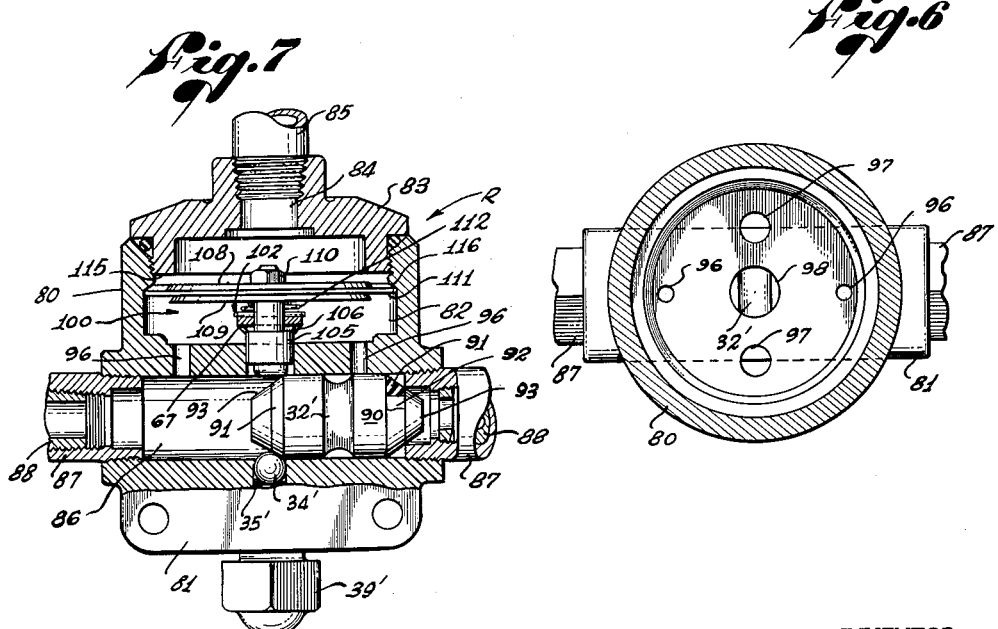
INVENTOR.
JAMES L. STRATTON
BY Fulwider Mattingly & Huntley
Attorneys

United States Patent Office 3,032,052
Patented May 1, 1962

3,032,052
SAFETY BRAKE VALVE
James L. Stratton, 1239 S. Atlantic Blvd.,
Los Angeles, Calif.
Filed May 28, 1959, Ser. No. 816,429
12 Claims. (Cl. 137—102)

The present invention relates generally to safety brake valves for motor vehicles, and more particularly to an improved valve of this type that automatically interrupts fluid pressure communication between a source of pressure and a defective line or brake, thereby preserving fluid for an application to remaining operative portions of the brake system.

An object of my invention is to provide an automatic safety brake valve for use in air brake systems for the protection of front axle brakes and rear axle or trailer brakes.

A further object of the invention is to provide a brake valve of this type that can be incorporated into the braking system of both new and used vehicles, the valve being extremely light in weight so as not to subtract from the payload of the vehicle.

Another object of the invention is to provide a safety brake valve with a means for retaining the safety valve in a neutral position whereby normal surges in the system do not cause operation of the valve, while upon the occurrence of a leak in the system the valve closes substantially instantaneously.

Yet another object of the invention is to provide a safety brake valve for use in air brake systems that will automatically close off a defective portion of the brake system so as to permit operation of unimpaired portions of the system, the unimpaired portions of the system continuing to operate in an entirely normal manner, and particularly a valve of this type that is adapted to reduce the time required to release the operative brakes by hastening the exhaust of air pressure from the brake chambers.

These and other objects and advantages of my invention will be apparent from the following description when taken in conjunction with the annexed drawings in which:

FIGURE 1 is a sectional view taken through the median plane of the body of a front axle safety brake valve for use in air brake systems;

FIGURE 2 is a view similar to FIGURE 1 but showing the relationship of the parts of the valve after it has automatically closed to separate the front axle brakes from the rest of the braking system;

FIGURE 3 is an elevational view with cutaway portions to show the other parts of the valve;

FIGURE 4 is a partial sectional view taken on the line 4—4 of FIGURE 3;

FIGURE 5 is a sectional view taken along the median plane of the body of a rear axle safety brake valve for use in air brake systems;

FIGURE 6 is a sectional view taken on the line 6—6 of FIGURE 5; and

FIGURE 7 is a view similar to FIGURE 5 but showing parts of the valve in positions assumed thereby upon automatic operation of the valve.

The valve of FIGURES 1 through 4 is designated generally by the letter "F" and is mounted on or adjacent the front axle of a vehicle having an air brake system. The valve F has a single inlet which is communicated through a hose or other suitable conduit to an outlet of a brake system actuating valve at the operator's position of the vehicle through which compressed air is selectively transmitted to the valve F. The valve F also has a pair of outlets, there being an outlet to each of the pair of conventional brake chambers mounted adjacent each wheel of the front axle. During normal operation of the air brake system operation of the actuating valve causes the valve F to transmit compressed air to the pair of brake chambers on the front axle, and upon release of the brakes by the vehicle operator the valve F hastens the exhausting of air from the brake chambers. In the event of a leak or other similar impairment of a portion of the front axle brake system, the valve F instantaneously closes both outlets so that application of the brakes will not cause the vehicle to swerve to one side or the other as a result of application of a braking force to only one of the front wheels of the vehicle.

More specifically, the valve F has a generally cylindrical body 10 surmounting a substantially rectangular portion 11 integrally formed with the body 10. A cover 12 is provided for closing the upper end of a substantially cylindrical chamber 16 formed in the valve body 10. This cover on its lower face is formed with a cylindrical downwardly extending flange 13 which threadedly engages complementary internal threads formed in the chamber 16. In order to seal the chamber 16 the cover 12 mounts an elastomeric O-ring 14 around the flange 13. It will be noted that the upper end face of the cylindrical wall of the valve body 10 is of frusto-conical downwardly and inwardly tapering configuration, as indicated at 15, to seat the O-ring 14.

The cover 12 is centrally formed with an inlet port 17 threadedly adapted for the reception of a fitting 18 by means of which a hose or other suitable conduit conducts air from the operator-controlled brake valve of the vehicle. Upon actuation of the brakes air is admitted through the inlet port 17 into the chamber 16. The rectangular portion 11 of the valve body is formed with a plunger chamber 20 extending therethrough and the floor of the chamber 16 is formed with a pair of diametrically oppositely positioned distributing passages 21 to intercommunicate opposite ends of the plunger chamber 20 with air in the upper chamber.

The chamber 20 reciprocably slidably supports a plunger 24 having an over-all axial length substantially equal to the spacing between the pair of distributing passages 21. The plunger 24 is formed with a pair of opposite-end frusto-conical sections 25, each of which terminate in a reduced-diameter neck 26. A pair of adapters 28 are threadedly mounted in opposite ends of the chamber 20 and each of these is adapted to loosely seat an end of the plunger 24. It will be understood that the pair of adapters 28 comprise the outlet ports of the valve F, each of these being adapted for connection to a hose coupler 31 for communicating each of the outlet ports with one of the pair of brake chambers on the front axle of the vehicle.

The plunger 24 is shown in neutral position in FIGURE 1, and to ensure that normal surges in air pressure will not cause displacement of the plunger to either end of the chamber 20 I have provided exteriorly adjustable means for yieldably maintaining the plunger in neutral position. The plunger 24 is formed with a central circumferentially extending groove 32 of concave configuration that is in concentric registration with a bore 33 extending from the chamber 20 downwardly through the rectangular portion 11. A ball 34 is slidably mounted in the upper end of the bore 33 and is held in retaining engagement with the plunger groove 32 by a spring 35. The lower end of the bore 33 threadedly mounts an adjusting screw 36 and lockscrew 37 by means of which the force of the spring 35 is brought to bear on the retaining ball 34 and plunger 24. To seal the lower end of the bore 33 to the atmosphere, a gasket 38 is retained in place on an exteriorly threaded boss which receives a capnut 39.

The upper chamber 16 contains a valve assembly designated generally by the numeral 40 which is adapted to aid the spring-loaded ball 34 in retaining the plunger 24 in neutral position against the force of normal surges in the brake system. The assembly 40 is also adapted to hasten the exhaust of air under pressure from the brake chambers upon release of the brakes, or to hold a set position of the brakes, and further is adapted to respond to displacement of the plunger 24 out of a neutral position to cause closure of the valve F to both front wheel brake chambers.

The valve assembly 40 includes a capscrew 42 threadedly mounting on its lower end a valve-stem member 43. To keep the valve assembly 40 in coaxial position within the chamber 16, the stem 43 has an enlarged head which is axially slidable within a bore 44 centrally formed in the floor of the chamber 16 and extending to the plunger chamber 20. At its upper end the assembly 40 includes a poppet seal means 41 for controlling the flow of compressed air from the inlet port 17 and at its lower end includes an exhaust valve assembly 45 for quickly relieving the valve F and the pair of brake chambers of compressed air. Between this pair of valve means the assembly 40 mounts a disc 46 for automatically closing both outlet ports in the event of a leak downstream of either outlet port.

The disc 46 is coaxially affixed on the capscrew 42, being clamped in place against the upper end of the stem 43 by a locknut 47. A tubular retainer 48 is slidably mounted on the upper end of the capscrew 42 and is adapted to coaxially receive a pair of retaining discs 49 and 50. A circular poppet seal 51 is sandwiched between the peripheral edges of the discs 49 and 50 to protrude radially outwardly therefrom. To hold the discs 49 and 50 and poppet seal 51 in assembled relationship, the retainer 48 at its lower end is formed with an upwardly facing shoulder 52 and at its upper end is adapted to threadedly receive a locknut 53. This poppet seal assembly 41 is normally retained in an uppermost position on the capscrew 42 by a spring 54 interposed between the upper face of the disc 46 and the lower face of the poppet-retaining disc 50 so that the poppet seal assembly bears against the head of the capscrew 42.

In order to exhaust the air from the pair of front axle brake chambers when the brakes are released, the floor of the chamber 16 is formed with a pair of diametrically opposite exhaust ports 56, these ports being located on a diameter which is normal to the diameter of the valve body along which the distributing passages 21 are located. Each of these exhaust ports has a blind lower end which communicates with a pair of branch ports 57 which extend outwardly from an exhaust port 56 to open into the side wall of the valve body 10. The axes of the branch ports 57 are angularly disposed relative to the direction of travel of the vehicle on which the valve F is mounted so that their enlarged openings 58 are not aligned with the airstream flowing over the valve body 10 when the vehicle is in motion. Each of the enlarged openings 58 seats a screen 59 against which one end of a very light spring 60 is seated. The other end of the light spring 60 engages a ball 61 normally retained on a seat 62 defined at the junction of a branch port 57 and exhaust port 56. This arrangement is very effective in preventing entry of foreign matter into the valve.

For supporting the exhaust valve means 45 stem 43 adjacent its lower end is formed with an upwardly facing shoulder 65 on which a substantially rectangular support bar 67 rests, the bar being slidably mounted on a reduced-diameter portion of the stem 43 through a central bore formed in the bar 67. At diametrically opposite ends the bar 67 has a pair of seal retainers 68 fastened thereto. Since the support bar 67 is also angularly slidable relative to the stem 43 the retainers 68 are formed with elongated frusto-conical nose-guide portions 69 so that the support bar 67 is held against angular movement out of the proper relationship to the exhaust ports. Each of the retainers 68 mounts a frusto-conical elastomeric seal member 69 adapted for seating on the exhaust ports 56 to close the ports. A spiral spring 70 is interposed between the upper face of the bar 67 and the lower face of the fixed disc 46 so that the exhaust seal assembly is normally held against the upwardly facing shoulder 65 of the stem, and this spring is of lesser force than the spring 54.

To provide a sealing means for emergency actuation of the valve F, the upper chamber 16 is formed with an annular upwardly facing shoulder 72 within which an elastomeric O-ring 73 is partially recessed in a suitable groove. It will be observed that the disc 46 overhangs the O-ring 73 so that upon downward movement of the valve assembly 40 the disc 46 seats itself upon the O-ring 73 to prevent the passage of air pressure downwardly therebeyond.

In FIGURE 1 the valve F is shown in a holding position in which equal air pressures are assumed on opposite sides of the poppet valve means 41, the equal pressures arising from the fact that the exhaust ports 56 are concurrently closed by the seals 69 and the operator's actuating valve also being assumed to be in a holding position—i.e., not open to the atmosphere and not introducing any further air pressure into the system. Upon further operation of the operator's actuating valve additional air pressure is introduced into the valve inlet 17 whereby the poppet valve means 41 further compresses the spring 47 and the poppet seal 51 is moved out of sealing engagement with the portion 13 of the valve cap 12. Inasmuch as further downward movement of the capscrew 42 and valve stem 43 is prevented by engagement of the stem with the plunger 24, the disc 46 is held out of engagement with the O-ring 73. Air pressure then passes around the periphery of the disc 46 and is passed through the distributing passages 21 and thence outwardly through both outlet ports 28 for further application of the vehicle brakes.

When the operator's actuating valve is returned to a holding position the air pressure in the brake chambers and below the poppet valve means 41 equals the air pressure above the poppet valve means. The spring 54 then forces the poppet valve assembly to return to the position indicated in FIGURE 1, the exhaust ports 56 remaining closed due to the action of the spring 70.

Upon complete release of the operator's actuating valve the pressure above the poppet valve means 41 is reduced to atmospheric. The greater pressure beneath the poppet valve assembly then causes the valve assembly 40 as a whole to move upwardly beyond the position indicated in FIGURE 1, the poppet valve means 41 entering the cap flange 13. The upwardly facing shoulder on the valve stem 43 is thus caused to lift both exhaust seals 69 out of sealing engagement with the exhaust ports 56 and the pressure remaining in the brake chambers and within the valve F beneath the poppet valve assembly is exhausted outwardly through the exhaust ports 56 and branch ports 57. During such exhausting of remaining air pressure the light springs 60 are easily overcome so that the sealing balls 61 are removed from their seats 62. As the pressure remaining within the brake chambers and the portion of the valve F under the poppet valve assembly approaches atmospheric, the balls 61 are returned to their seats 62 by the force of the springs 60.

In the event of a failure in the portion of the braking system between either of the outlet ports 28 and one of the front wheel brake chambers, the valve F automatically shuts off the entire front wheel brake system in the following manner. Upon actuation of the operator's actuating valve the valve assembly 40 as a whole is moved downwardly until the valve stem 43 engages the plunger 24. Thereafter the poppet valve means 41 is further forced downwardly by the incoming air pressure which passes around the disc 46 and into the distributing passages 21, thence outwardly through both outlet ports 28 to the front wheel brake chambers. Since one of the brake chambers is assumed to have a leak, there will be a resulting imbalance of air pressure across opposite ends of the plunger 24 whereby the plunger will be displaced from neutral position to close one of the outlet ports 28 (see FIGURE 2). This movement of the plunger 24 allows the valve stem 43 to move further downward to engage a reduced-diameter portion on an end of the plunger 24. Inasmuch as the disc 46 is affixed to the valve stem assembly it is moved into sealing engagement with the O-ring 73, thereby preventing the passage of compressed air to both front wheel brake chambers. The valve F thus prevents a braking force being applied to only one of the front wheels and dangerous swerving of the vehicle is accordingly avoided.

In FIGURES 5 through 7 there is shown a valve designated generally as "R" which is adapted for utilization on a rear axle of a vehicle having an air brake system. This valve also has a single inlet which is communicated through a suitable conduit to an outlet of an operator's actuating valve, to control the passage of compressed air to the pair of brake chambers on a rear axle. Like the valve F, the valve R can assume a holding position and is also adapted, upon release of the brakes, to hasten the exhausting of air from the brake chambers. However, unlike the valve F, upon a leak occurring in a portion of the rear axle brake system the valve R closes to only the impaired portion of the system, leaving the other brake chamber for operation in the normal manner.

More specifically, the valve R has a generally cylindrical body 80 surmounting an integrally formed substantially rectangular portion 81. A substantially cylindrical upper chamber 82 is formed in the body 80 and is closed at its upper end by a cap 83, which is formed with a central inlet port 84. A fitting 85 is threadedly mounted in the inlet port 84 by means of which a hose or the like conducts air from the brake-system actuating valve.

The rectangular portion 81 of the valve body is also formed with a substantially cylindrical chamber 86 extending therethrough along an axis normal to the axis of the upper chamber 82. The opposite ends of the chamber 86 comprise outlets to the opposite brake chambers and are each provided with an adapter 87 for mounting a fitting 88 connected to one end of a hose the other end of which communicates with a brake chamber.

For automatically closing one or the other of the outlet ports the chamber 86 reciprocably slidably mounts a plunger 90. This plunger is adapted for sealing engagement with either adapter 87 being provided with a central circumferentially extending concave groove 32' and a pair of opposite-end annular seal members 91 each of which is mounted on a reduced-diameter neck 92 between the body of the plunger and a frusto-conically shaped flange 93. For yieldably retaining the plunger 90 in a neutral position the valve R is provided with a spring-loaded ball means substantially identical to the counterpart means employed in the valve F. Accordingly, these parts will not be described in detail; suffice it to say that the rectangular portion 81 of the valve body is formed with a bore 33' extending downwardly from the chamber 86 and containing a retaining ball 34', spring 35', adjustment screws 36' and 37', with this assembly being protected against exposure to the atmosphere by a gasket 38' and capnut 39'.

Extending through the floor of the upper chamber 82 are a pair of diametrically opposite distributing passages 96 and another pair of diametrically opposite exhaust ports 97. Referring now to FIGURE 7, it will be seen that the pair of distributing passages 96 serve to interconnect the upper chamber 82 and lower chamber 86. It will be understood that when the plunger 90 is in a neutral position within the chamber 86, the pair of distributing passages 96 are unobstructed and will pass air into the outlet ports 87. Referring to FIGURE 5, it will be observed that the pair of exhaust ports 97 communicate directly with the atmosphere and upon release of the brakes serve to permit a rapid exhausting of the air from the brake chambers and valve R.

The floor of the upper chamber 82 is also formed with a central bore 98 extending through to the lower chamber 86 which, in part, serves as a support means for a valve assembly 100 coaxially supported within the upper chamber 82. This valve assembly includes both a poppet valve means 101 and an exhaust valve means 102.

More specifically, the valve assembly 100 comprises a valve stem 105 of step-drill configuration, formed adjacent its lower end with a first upwardly facing shoulder 106 and adjacent its upper end with a second upwardly facing shoulder 107. A pair of poppet-retaining discs 108 and 109 are coaxially mounted on the upper end of the stem 105 to be seated on the upper shoulder 107 and are fastened against movement relative to the stem 105 by a nut 110 serving to clamp the discs against the upper shoulder. An annular poppet seal 111 of an elastomeric material is sandwiched between the peripheral edge portions of the discs 108 and 109.

The lower shoulder 106 seats an exhaust valve means 102 which is substantially identical to that utilized in the valve F. This assembly comprises a support bar 67 provided with a central bore which is slidable on the stem 105. A pair of retainers 68 are affixed to opposite ends of the bar 67 for supporting the frusto-conically shaped seals 69 in alignment with the exhaust ports 97. A spiral spring 112 is interposed between the disc 109 and the upper face of the support bar 67 to normally bias the exhaust valve assembly downwardly into seated position on the lower shoulder 106.

The valve assembly 100 as a whole is capable of limited axial movement within the upper chamber 82. Referring now to FIGURE 5, it will be seen that the cap 83 is formed with a downwardly extending circular flange threadedly engaged with the inner surface of the wall of the body 80 and whose lowermost face 115 confronts and provides an abutment for the upper disc 108. This is the fully raised position of the valve assembly 100 and in this position the poppet seal 111 is peripherally deformed by seating engagement with a frusto-conical downwardly facing seat 116 circumferentially formed on the valve body 80. At the same time, the exhaust valve means 102 has been lifted out of closing engagement with the exhaust ports 97 by the lower shoulder 106 of the valve stem.

The condition of the valve assembly 100 just described corresponds to the releasing phase of the brake system. When the brakes are released the air pressure on the under side of the poppet valve means 101 is greater than the air pressure above the poppet valve means, the operator's actuating valve being open to the atmosphere. Air is then rapidly exhausted from the rear axle brake chambers and escapes the valve R through the exhaust ports 97. As the air pressure on the under side of the poppet valve means 101 approaches atmospheric, the poppet seal 111, being of a resilient or elastically deformable material, reacts against the poppet seat 116, thrusting the valve assembly 100 downwardly, the valve assembly then assuming the position and condition illustrated in FIGURE 7.

In the latter condition the downward movement of the valve assembly 100 is limited by engagement of the valve stem 105 with the plunger 90, whether the plunger be in neutral or displaced position, inasmuch as the body portion of the plunger 90 has a length sufficient to confront the stem 105 with a full-diameter section of the plunger at all times. It will also be noted that in this condition the exhaust-port seals 69 are seated in the exhaust ports 97, the spring 112 has been slightly compressed and the exhaust-valve support bar 67 is slightly raised off of the shoulder 106.

Upon the actuating valve for the brake system being opened to the source of compressed air, air under pressure enters the valve R through the inlet port 84 and deforms the peripheral edge of the poppet seal 111 downwardly. It will be observed that the diameter of the lower disc 109 is less than the diameter of the upper disc 108, whereby the poppet seal 111 tends to fold itself downwardly and around the lower disc 109 to permit air to readily pass downwardly therearound. The compressed air then is distributed through the passages 96 to both outlet ports 87 for actuating a pair of brake chambers on a rear axle. When the vehicle brakes are being thus applied there will be momentary surges of pressure within the system, causing appreciable pressure differentials across opposite ends of the plunger 90. However, the spring-loaded retaining ball 34′, as well as the air pressure imposed on the assembly 100 and transmitted to the plunger 90 through the stem 105, will serve to maintain the plunger 90 in neutral position despite such momentary pressure differentials.

When the actuating valve of the system is in a holding position the parts of the valve R are substantially in the positions of FIGURE 7. Thus, the air pressure on top of the poppet valve means 101 is substantially equal to that beneath the poppet valve means. Since the pair of exhaust port valve members 68 are on their seats in the exhaust ports 97, the spring 112 will augment the pressure under the poppet valve means in forcing the poppet seal 111 into a closer fit with the seat 116. However, it is to be understood that the spring 112 is incapable of forcing the poppet seal 111 to the fully seated position of FIGURE 5 inasmuch as the support bar 67 engages the stem shoulder 106 before the poppet seal condition of FIGURE 5 can be reached. With this arrangement the poppet valve means 101 is allowed a generous range of axial movement, all the while maintaining the valve R in a holding condition.

When the vehicle operator completely releases his actuating valve the upper side of the poppet valve means 101 is at substantially atmospheric pressure while the under side of the poppet valve means is at greater than atmospheric pressure. The assembly 100 is thereby caused to be moved upwardly to the limit imposed by the face 115 of the valve cap 83. The exhaust valve means 102 is thereby opened, permitting the escape of air from the brake chambers through the exhaust ports 97. As the air pressure on the under side of the poppet valve means 101 approaches atmospheric, the poppet seal 111 once again reacts with its seat 116 to urge the assembly 100 to its lowermost position, depicted in FIGURE 7.

In the event of a leak in any portion of the system between one of the rear axle brake chambers and an outlet port 87, the plunger 90 will immediately be displaced to a position to close the corresponding port 87 upon actuation of the brake system. With the plunger 90 closing a port 87 as shown in FIGURE 7, a full-diameter portion of the plunger will nevertheless prevent the valve stem 105 from entering the plunger chamber 86. At the same time, the retaining ball 34′ will engage one end of the plunger 90, tending to maintain the plunger 90 in a closed position. The defective portion of the system is thus effectively sealed off, and the unimpaired portion of the rear axle system can be operated in the usual manner.

Although several embodiments of my invention have been illustrated and described herein, it is to be understood that I do not mean to be limited to the several details of construction set forth above, but only by the spirit and scope of the appended claims.

I claim:

1. In a brake valve the combination comprising: a valve body formed with a pair of chambers one of which has an inlet port and the other of which has a pair of outlet ports, with said pair of chambers having fluid communication with one another through a pair of distributing passages; a plunger in said other chamber yieldably held in a neutral position wherein both said outlet ports are unobstructed by said plunger; a valve means in said one chamber for normally closing said one chamber to said inlet port and adapted to yield to a pressure fluid introduced into said inlet port to transmit said pressure fluid through said distributing passages and outlet ports; and exhaust valve means in said one chamber for releasing pressure fluid when pressure in said one chamber exceeds pressure in said inlet port.

2. In an air brake valve the combination comprising: a valve body formed with a pair of chambers one of which has an inlet port and the other of which has a pair of outlet ports, with said pair of chambers having fluid communication with one another through a pair of distributing passages, said one chamber also having at least one exhaust port; a valve means in said other chamber adapted and arranged for alternately closing either of said outlet ports; an inlet valve means in said one chamber for normally closing said inlet port and adapted to yield to a pressure fluid introduced into said inlet port to transmit said pressure fluid through said distributing passages and outlet ports, said pair of valve means having cooperating means to impress the force of said pressure fluid on said first-mentioned valve means, said cooperating means being adapted and arranged to yieldably maintain said first valve means in a neutral position wherein both said outlet ports are open; and an exhaust valve means in said one chamber biased to close said exhaust port and operatively associated with said cooperating means to open said exhaust port when the pressure of fluid in said one chamber exceeds the pressure of fluid in said inlet port.

3. In an air brake valve the combination comprising: a valve body formed with a pair of chambers one of which has an inlet port and the other of which has a pair of outlet ports, with said pair of chambers having fluid communication with one another through a pair of distributing passages, said one chamber also having at least one exhaust port; a valve means in said other chamber adapted and arranged for alternately closing either of said outlet ports in response to a differential of opposed fluid pressures imposed on said valve means; an inlet valve means in said one chamber adapted to yield to a pressure fluid introduced into said inlet port to transmit said fluid through said distribuiting passages and outlet ports, said pair of valve means having cooperating means to impress the force of said introduced fluid on said first-mentioned valve means, said cooperating means being adapted and arranged to yieldably maintain said first valve means in a neutral position wherein both said outlet ports are open; and an exhaust valve means in said one chamber biased to a position closing said exhaust port and having a connection with said inlet valve means adapted for moving said exhaust valve means to an open position when said inlet valve means moves in a closing direction due to a higher pressure in said one chamber than in said inlet port.

4. In an air brake valve the combination comprising: a valve body formed with a pair of chambers one of which has an inlet port and the other of which has a pair of outlet ports, with said pair of chambers having fluid communication with one another through a pair of distributing passages, said one chamber also having at least one exhaust port; a valve means in said other chamber adapted and arranged for alternately closing either of said outlet ports in response to a differential of opposed fluid pressures imposed on said valve means; an inlet valve means in said one chamber for closing said inlet port and adapted to yield to a pressure fluid introduced into said inlet port to transmit said pressure fluid through said distributing passages and outlet ports, said inlet valve means having a stem engageable with said first-mentioned valve means when said inlet valve opens to impress the force of said pressure fluid on said first-mentioned valve means to yieldably maintain said first-mentioned valve means in a neutral position wherein both said outlet ports are open; and an exhaust valve means in said one chamber biased to a position closing said exhaust port and having a lost-motion connection with said stem adapted for moving said exhaust valve means to open position when said inlet valve means is moved in a closing direction beyond an initially closed position, said inlet valve means being adapted to move beyond said initially closed position when subjected to unequal opposed fluid pressures tending to move said stem out of engagement with said first-mentioned valve means.

5. In an air brake valve the combination comprising: a valve body formed with a pair of chambers one of which has an inlet port and the other of which has a pair of outlet ports, with said pair of chambers having fluid communication with one another through a pair of distributing passages, said one chamber also having a pair of outlet ports, said one chamber also having at least one exhaust port; a valve means in said other chamber adapted and arranged for alternately closing either of said outlet ports in response to a differential of opposed fluid pressures imposed on said valve means; a means in said body for yieldably maintaining said valve means in a neutral position wherein both said outlet ports are open; an inlet valve means in said one chamber for closing said inlet port in a first position and adapted to yield to a pressure fluid introduced into said inlet port to transmit said pressure fluid through said distributing passages and outlet ports; and an exhaust valve means in said one chamber biased to a position closing said exhaust port and having a lost-motion connection with said inlet valve means adapted for moving said exhaust valve means to open position when said inlet valve means is moved beyond said first position in a closing direction.

6. In an air brake valve the combination comprising: a valve body formed with a pair of chambers one of which has an inlet port and the other of which has a pair of outlet ports, with said pair of chambers having fluid communication with one another through a pair of distributing passages, said one chamber also having at least one exhaust port; a valve means in said other chamber adapted and arranged for alternately closing either of said outlet ports in response to a differential of opposed fluid pressures imposed on said valve means; a means in said body for yieldably maintaining said valve means in a neutral position wherein both said outlet ports are open; an inlet valve means in said one chamber for closing said inlet port in a first position and adapted to yield to a pressure fluid introduced into said inlet port to transmit said pressure fluid through said distributing passages and outlet ports, said inlet valve means having a stem engageable with said first-mentioned valve means when said pressure fluid is present in said inlet port to impress the force of said pressure fluid on said first-mentioned valve means to augment the force of said yieldable means for maintaining said first-mentioned valve means in said neutral position; and an exhaust valve means in said one chamber biased to a position closing said exhaust port and having a lost-motion connection with said stem adapted for moving said exhaust valve means to open position only when said inlet valve means is moved in a closing direction beyond said first position, said inlet valve means being moved beyond said first position when subjected to unequal opposed fluid pressures tending to move said stem out of engagement with said first-mentioned valve means.

7. A brake valve as set forth in claim 6 in which said first-mentioned valve means comprises a plunger reciprocably slidably mounted in said other chamber, and said yieldable means comprises a spring-loaded detent means, said plunger and said stem being slidably engageable to permit movement of said plunger to a closed position on one of said outlet ports when engaged by said stem.

8. A valve as set forth in claim 7 in which said plunger in both said neutral and closed positions is adapted to limit movement of said stem in a direction for opening of said inlet valve means to the same extent in both of said positions of said plunger.

9. A valve as set forth in claim 7 in which said stem has affixed thereto a disc adapted for engagement with a complementary sealing means in said one chamber and held out of engagement with said sealing means by said stem and plunger only when said plunger is in said neutral position, said plunger being adapted to permit movement of said stem and disc for engagement of said sealing means by said disc only when said plunger closes one of said outlet ports, said disc and sealing means when engaged being adapted and arranged to prevent pressure fluid entering said inlet port from entering said pair of distributing passages.

10. In an airbrake valve the combination comprising: a valve body formed with first and second chambers having fluid communication with one another through a pair of distributing passages, said first chamber having an inlet port and at least one exhaust port and said second chamber having a pair of opposite outlet ports; a plunger reciprocably slidably mounted in said second chamber that is adapted for alternately closing either one of said outlet ports; a resiliently mounted means in said body adapted and arranged for yieldably mantaining said plunger in a neutral position wherein pressure fluid can pass from said distributing passages to said outlet ports; a stem in said first chamber that is slidably supported for reciprocation towards and away from abutment of one end against said plunger; an inlet valve means on the other end of said stem for controlling the flow of pressure fluid from said inlet port into said first chamber and adapted to transmit the force of incoming fluid pressure to said plunger through said stem to aid in maintaining said plunger in said neutral position; and an exhaust valve means in said first chamber movably mounted on said stem and biased to a position closing said exhaust port, said stem and exhaust valve means being adapted for movement of said exhaust valve means out of port-closing position when said stem is lifted out of engagement with said plunger, said inlet valve means being adapted to lift said stem when the pressure of fluid in said inlet port is less than the pressure of fluid in said first chamber.

11. In an air brake valve the combination comprising: a valve body formed with a pair of chambers one of which has an inlet port and the other of which has a pair of outlet ports, said pair of chambers having fluid communication with one another through a pair of distributing passages, said one chamber also having at least one exhaust port; an inlet valve means in said one chamber for closing said inlet port when in a first position and adapted to yield to a pressure fluid introduced into said inlet port to transmit said pressure fluid through said distributing passages and outlet ports; and an exhaust valve means in said one chamber biased to a position closing said exhaust port and operatively associated with said inlet valve means to open said exhaust port when the pressure of fluid in said one chamber exceeds the pressure of fluid in said inlet port.

12. A valve as set forth in claim 11 in which said inlet valve means and exhaust valve means are mounted on a common support for limited movement relative to said support and are normally held in closed positions by spring means urging said valve means apart against a pair of opposite end abutments of said support, said inlet valve means, when normally closed being movable farther in a closing direction by the existence of a higher pressure in said one chamber than the pressure in said inlet port whereby said exhaust valve means is lifted from said exhaust port.

References Cited in the file of this patent

UNITED STATES PATENTS

| | | |
|---|---|---|
| 2,386,585 | Blank | Oct. 9, 1945 |
| 2,718,897 | Andrews | Sept. 27, 1955 |
| 2,861,845 | Keehn | Nov. 25, 1958 |
| 2,902,043 | Margida | Sept. 1, 1959 |

FOREIGN PATENTS

| | | |
|---|---|---|
| 135,398 | Sweden | Apr. 22, 1952 |